United States Patent [19]

Masuda

[11] 3,900,814
[45] Aug. 19, 1975

[54] REVOLUTION SENSING APPARATUS

[75] Inventor: Noboru Masuda, Kawaguchi, Japan

[73] Assignee: Denki Onkyo Company, Ltd., Tokyo, Japan

[22] Filed: May 31, 1973

[21] Appl. No.: 365,502

[52] U.S. Cl. .............................. 338/32 R; 335/215
[51] Int. Cl. ................................................ H01c 7/16
[58] Field of Search....... 338/32 H, 32 R; 323/44 H; 324/45, 46; 335/1, 3, 215

[56] References Cited
UNITED STATES PATENTS
3,671,874  6/1972  Kobayashi..................... 338/32 H X

*Primary Examiner*—C. L. Albritton
*Attorney, Agent, or Firm*—Armstrong, Nikaido & Wegner

[57] ABSTRACT

A revolution sensing apparatus in which a magnetic circuit is formed by a fixed yoke and a moving yoke which are opposed with a gap. A magnets resistance effect device is provided on a flat surface of the fixed yoke which faces the gap, and said moving yoke is adapted to be moved by an external revolution torque along said flat surface. Projected segments facing said flat surface are provided on said moving yoke in the direction of movement of said moving yoke and the magnetic flux is concentrated by each of said projected segments and is applied to said device as said moving yoke moves.

13 Claims, 35 Drawing Figures

REVOLUTION SENSING APPARATUS

BACKGROUND OF THE INVENTION

The present invention relates to a revolution sensing apparatus which obtains electric signals from an external mechanical revolving system and in particular to a revolution sensing apparatus for obtaining electric signals through detection of the variation of a magnetic field in accordance with the movement of the revolving system by a magneto-resistance effect device.

As is well known, the detection of the revolution of a mechanically revolving system can be determined by electric signals to measure the amount of revolution or the angle of revolution and furthermore to control other mechanical systems or to measure the flow in accordance with the amount of revolution or the angle of revolution. For this reason, it is necessary to develop a revolution sensing apparatus which is highly reliable and capable of precision detection of revolution.

If a number of electrical signals, that is, pulses are to be generated during one stroke of a member of this type of apparatus driven by an external mechanical revolving system, a number of single magneto-resistance effect devices can be arranged. However, this construction requires unnecessarily high production costs and complicated manufacturing processes.

Figure 23:
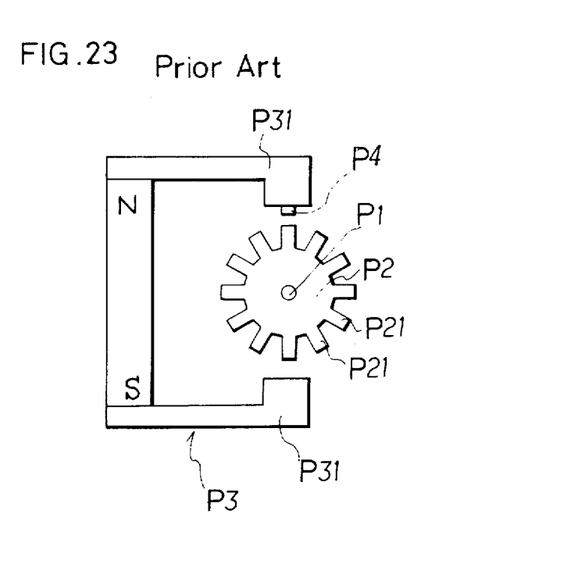
FIG. 23 is a front view illustrating a conventional revolution sensing apparatus.

Conventionally, it has been proposed to develop an apparatus as shown in FIG. 23 in order to generate a number of pulses during one stroke. This apparatus is comprised of revolving yoke P2 on which a plurality of projected segments P21 are radially arranged around revolving shaft P1 and inserted into magnetic circuit P3, magneto-resistance effect devices P4 are fixed on magnetic pole members P31. This conventional apparatus is designed so that the projected segments of the revolving yoke are opposed to the magnetic pole member in a pair of gaps in the magnetic path. Accordingly, the magnetic resistance of the magnetic path is large and an extreme edge effect is apt to occur; therefore the magnetic flux distribution may become uneven.

The present invention eliminates the above defects and provides the revolution sensing apparatus with a new construction different from the conventional device.

SUMMARY

The present invention provides a revolution sensing apparatus in which a moving yoke is coupled to a revolving shaft which is revolved by an external mechanical revolving system so that said moving yoke is revolved by said revolving shaft. The moving yoke in combination with a fixed yoke including magnets form a magnetic circiut which is adapted so that the extreme end of said moving yoke is opposed to a flat part of said fixed yoke with a gap there between through which a magnetic flux flows. The moving yoke is adapted to revolve along the flat part which intersects at a right angle to the direction of the magnetic flux flowing in said gap. A plurality of projected segments are provided which face said flat part of the fixed yoke on the extreme end face along the revolving direction of said moving yoke. A magneto-resistance effect device is arranged at a position opposing to said projected segments provided on the moving yoke in said gap, and shorting segments which are provided across said magnetro-resistance effect device in the direction intersecting the revolving direction of said moving yoke form a plurality of magnetism sensing parts in the revolving direction of said moving yoke which are adapted so that the magnetic flux is concentrated in sequence onto said magnetism sensing parts when said moving yoke revolves. Thus the resistance value of the device varies in the form of a pulse when the revolving shaft is revolved.

BRIEF DESCRIPTION OF DRAWINGS

The present invention is described in detail by the accoompanying drawings wherein:

FIG. 1 is an isometric view showing an embodiment of the revolution sensing apparatus according to the present invention, FIG. 2 is an isometric view of the moving yoke to be employed in the embodiment shown in FIG. 1 as seen from the direction of elevation angle, FIG. 3 is a plan view illustrating the magneto-resistance effect device to be employed in the embodiment shown in FIG. 1, FIGS. 4 and 5 are partly magnified front views illustrating the operation of the apparatus in accordance with the present invention, FIG. 6 is a circuit diagram illustrating the connection of the magneto-resistance effect device to be employed in the apparatus of the present invention.

DETAILED DESCRIPTION OF THE INVENTION

Figures 1, 2, 3, 4, 5, 6:
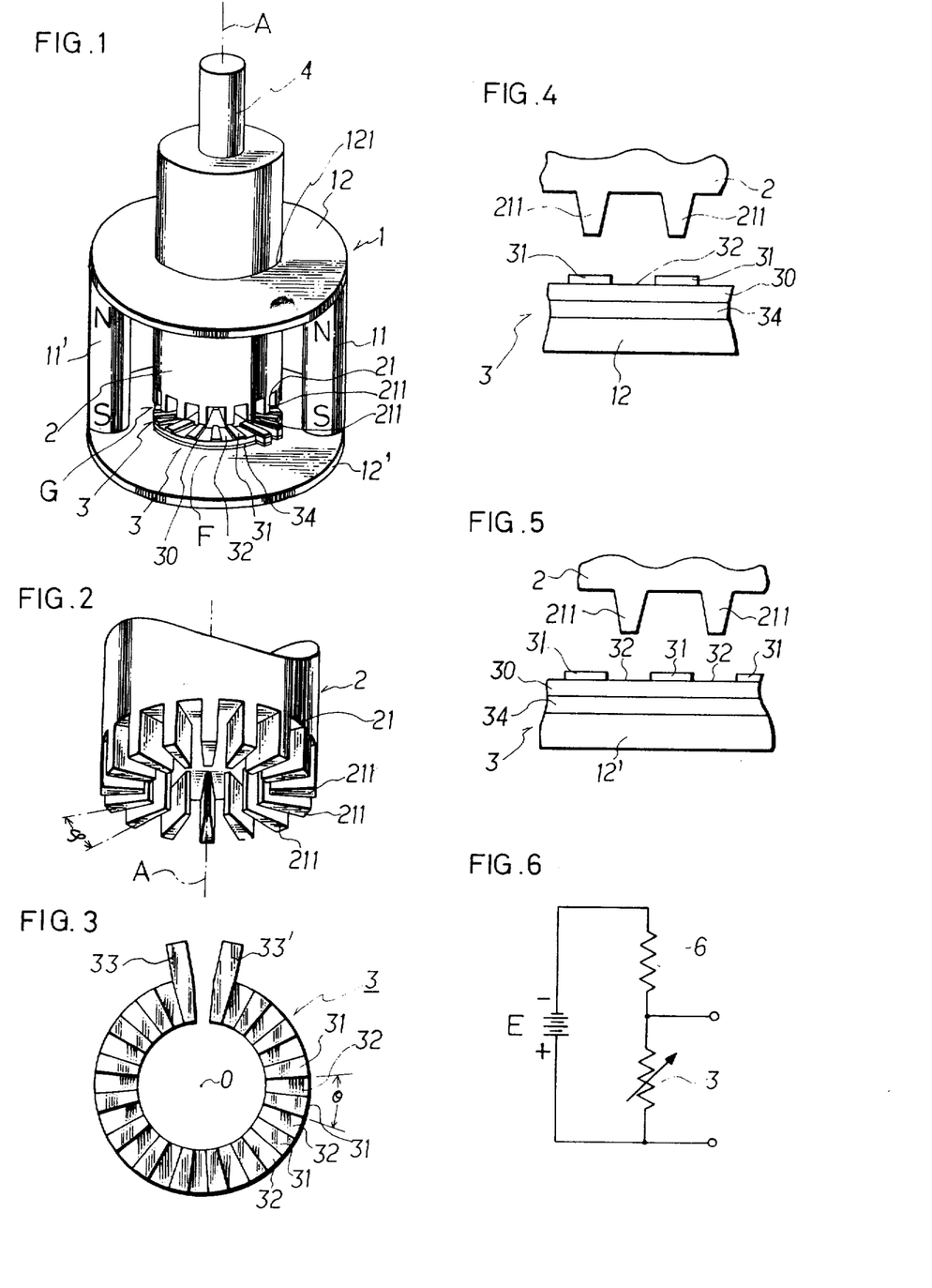

Referring to FIG. 1, there is shown an embodiment of a revolution sensing apparatus in accordance with the present invention comprising fixed yoke 1 forming a fixed part of a magnetic circuit, moving yoke 2 forming a moving part of said magnetic circuit, revolving shaft 4 which revolves said moving yoke 2 and magneto-resistance effect device 3 (hereinafter referred to as "device") inserted into said magnetic circuit.

Fixed yoke 1 is made by arranging a paiar of magnets 11 and 11' so that the same poles of these magnets are positioned at the same side and sandwiching the magnets with discs 12 and 12' made of a magnetic material such as, for example, ferrite. Through hole 121 is provided at the center of disc 12.

Moving yoke 2 is made from a rod of magnetic material such as ferrite. Moving yoke 2 is adapted so that it passes through hole 121 of disc 12 at a right angle to the flat surface of disc 12 and can revolve about center axis A as the center of revolution. The extreme end 21 of said moving yoke is opposed to flat part F of disc 12' with gap G. Furthermore, revolving shaft 4 is coaxially fixed in moving yoke 2.

A plurality of projected segments 211 facing flat part F of disc 12' are arranged on the face of extreme end 21 of said moving yoke in reference to the axis of revolution of said moving yoke.

In the construction described above, the magnetic flux flows in gap G and is concentrated by projected segments 211. Said moving yoke can be revolved in a plane intersecting at a right angle the direction of magnetic flux flow.

Magneto-resistance effect device 3 is fixed to disc 12' through insulating material 34 in said gap. Said magneto-resistance effect device is made by providing a plurality of shorting segments 31 made of a conductive material such as indium on a semiconductor plate 30 made of a semiconductor material having the magneto-resistance effect such as indium antimonide or indium arsenic in the shape of partly chipped link.

Said device is arranged so that center O of the device is positioned on a line extended from center axis A of said moving yoke, that is, concentrically arranged and the diameter of the device is determined so that the projected segments are opposed to the surface of the device.

As shown in FIG. 3, shorting segments 31 are provided across the semiconductor plate in a direction intersecting the circumferential direction of the device, that is, the revolving direction of the moving yoke. Said device is provided with a number of magnetism sensing parts 32 with intervals at which shorting segments are arranged. The shorting segments provided at both ends of the device are used as the electrode and are provided with terminals 33 and 33' to supply the current to the device, that is, to apply the voltage across both ends of the device.

Accordingly, the shorting segments are provided across the current flowing direction.

Said magnetism sensing parts 32 are arranged so that, when one magnetism sensing part is opposed to one projected segment, the rest of magnetism sensing parts are opposed respectively to other corresponding projected segments. In other words, when one shorting segment is opposed to one projected segment, the rest of shorting segments opposed to other projected segments. The magnetism sensing parts are formed so that angle $\theta$ formed by a pair of adjacent magnetism sensing parts in reference to center O is equal to angle $\phi$ formed by a pair of adjacent projected segments in reference to axis A.

Accordingly, when the moving yoke is positioned at a position shown in FIG. 4, the magnetic flux concentrated between projected segments 211 and disc 12' is applied to shorting segments 31 and is not applied to magnetism sensing parts 32. Therefore, the resistance of the magnetism sensing parts is shown as the value of resistivity.

When moving yoke 2 is revolved to the position shown in FIG. 5, the magnetic flux is applied to the magnetism sensing parts 32; accordingly, the resistance value of the magnetism sensing part increases and the value of resistance across terminals 33 and 33' also increases.

Thus, the resistance between both terminals of device 3 cyclicly increases and decreases as many times as the number of projected segments during one rotation of moving yoke 2. Accordingly, the pulse output can be obtained from both terminals 33 and 33' of device 3 by connecting fixed resistor R in series to device 3 and applying a fixed voltage from power supply E to both ends of the series circuit formed by device 3 and resistor R as shown in FIG. 6.

The waveform of said pulse output can be varied by varying the length of the magnetism sensing parts in reference to the projected segments, that is, the distance between the projected segments in reference to the length of the shorting segments.

If the length of magnetism sensing parts 32 in the revolving direction of the moving yoke is $l1$, the length of shorting segments 31 in said same direction is $l2$, the length of projected segments 21 in said same direction is $l3$ and the distance between adjacent projected segments is $l4$, the following equation is given because the projected segments are arranged so that they can be opposed to the magnetism sensing parts at the same time.

$$l1 + l2 = l3 + l4$$

Figure 7A:
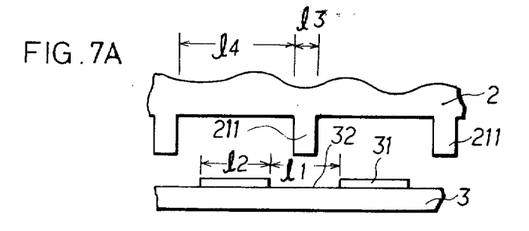
FIGS. 7A to 7G are partly magnified front views illustrating the relationship between the magneto-resistance effect device and the projected segments of the moving yoke which are employed in the apparatus of the present invention.
Figure 8A:
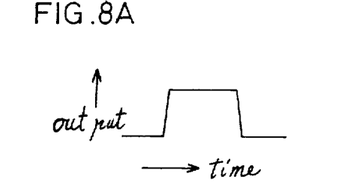
FIGS. 8A to 8G are diagrams showing the output waveform of the apparatus of the present invention.

If length $l3$ of projected segments 211 is smaller than length $l1$ of magnetism sensing parts 32 or distance $l4$ between adjacent parojected segments 211 is larger than length $l2$ of shorting segments 31 as shown in FIG. 7A, a trapezoidal pulse waveform as shown in FIG. 8A is obtained and it is seem that the larger length $l1$ of the magnetism sensing part is than length $l3$ of projected segments, the larger pulse duration t1 becomes.

Figure 7B:
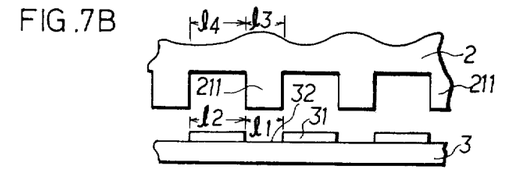
Figure 8B:
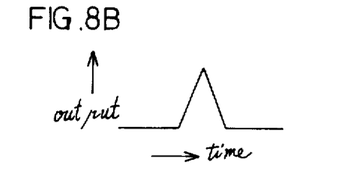

If length $l3$ of projected segments 211 is equal to length $l1$ of magnetism sensing parts 32 or distance $l4$ between the projected segments is equal to length $l2$ of shorting segments 31 as shown in FIG. 7B, an angular pulse waveform is obtained as shown in FIG. 8B.

Figure 7C:
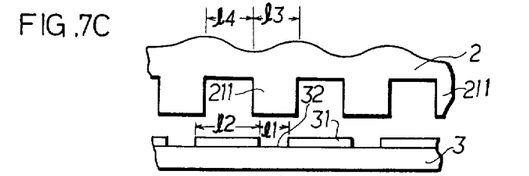
Figure 8C:
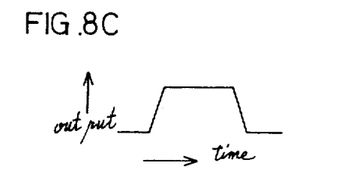

If length $l3$ of projected segments 211 is larger than length $l1$ of magnetism sensing parts 32 or distance $l4$ between the projected segments is smaller than length $l2$ of shorting segments 31 as shown in FIG. 7C, a trapezoidal pulse waveform is obtained as shown in FIG. 8C.

Figure 7D:
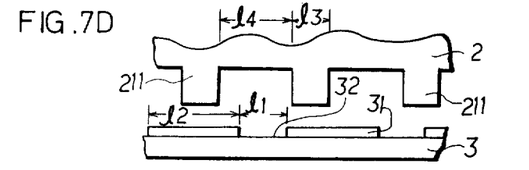
Figure 8D:
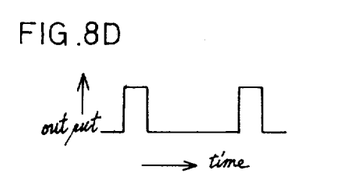

As shown in FIG. 7D, the larger distance $l4$ between adjacent projected segments 211 is than length $l1$ of magnetism sensing part 32 or the smaller length $l3$ of the projected segments is than length $l2$ of shorting segments 31, the larger distance $t2$ between the pulses becomes as shown in FIG. 8D.

Figure 7E:
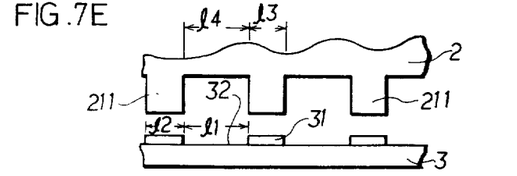
Figure 8E:
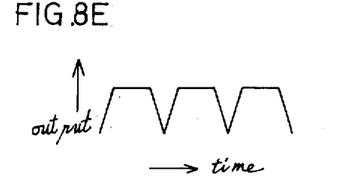

If distance $l4$ between adjacent projected segments 211 is equal to length $l1$ of magnetism sensing parts 32 or length $l3$ of the projected segments is equal to length $l2$ of shorting segments 31 as shown in FIG. 7E, a continuous pulse waveform as shown in FIG. 8E is obtained.

Figure 7F:
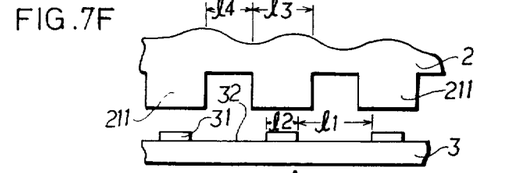
Figure 8F:
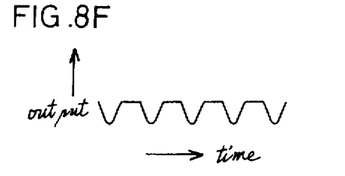

If length $l4$ of projected segments 211 is smaller than length $l1$ of magnetism sensing parts 32 or length $l3$ of the projected segments is larger than length $l2$ of shorting segments 31 as shown in FIG. 7F, a continuous pulse waveform with a small height and dull rise and fall as shown in FIG. 8F is obtained. Accordingly, it is not desirable to set the device in the relative position as described above and is desirable to set the device so that distance $l4$ between adjacent projected segments is equal to or larger than length $l1$ of the magnetism sensing parts, that is, so that length $l3$ of the projected segments is equal to or smaller than length $l2$ of the shorting segments.

Figure 7G:
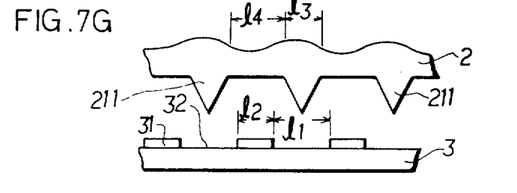
Figure 8G:
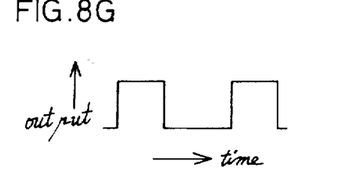

The above describes the relative conditions with respect to the length of the components. In addition, an ideal waveform with sharp rise and fall approximate to a square pulse as shown in FIG. 8G can be obtained by absolutely shortening length $l3$ of the projected segment. For example, as shown in FIG. 7G, projected segments 211 can be formed so that length $l3$ of the extreme ends of the projected segments is zero, that is, the extreme ends of the projected segments are opposed to the device at sharp angle and are not flattened.

The waveform of pulse can be set as desired by combining said conditions.

Hereupon, if it is assumed that there is one projected segment on the moving yoke and a plurality, for example, $n$ pieces of shorting segments 31, the number of pulses generated during one revolution of moving yoke 2 is equal to number $n$ of magnetism sensing parts 32 as in case of said embodiment according to the present invention.

From viewing the variation ratio of resistance between terminals 33 and 33' of device 3 in this case, it is known that, if the resistance values of resistivity values of magnetism sensing parts 32 when the magnetic flux does not flow are $R_1, R_2, \ldots, R_n$ and if the resistance value of the magnetism sensing part having the resistivity value of $R_1$ through which the magnetic flux flows is $KR_1$ ($K>1$), the magnetic flux does not flow in other magnetism sensing parts when it flows in said magnetism sensing part, resistors $R_2, R_3, \ldots, R_n$ are series-connected and consequently resistance variation ratio P is given below ignoring the resistance value of the shorting segments.

$$P = (KR_1 + R_2 + \ldots + R_n)/(R_1 + R_2 + R_3 + \ldots + R_n) < K$$

On the other hand, in case of the embodiment shown in FIG. 1, when the magnetic flux flows in one magnetism sensing part, the magnetic flux flows in all other magnetism sensing parts. Accordingly, resistance variation ratio P' is given below ignoring the resistance value of the shorting segments.

$$P' = (KR_1 + KR_2 + \ldots + KR_n)/(R_1 + R_2 + \ldots + R_n) = K.$$

This value is far larger than that in the preceding case and a favorable pulse is obtained.

Figure 9:
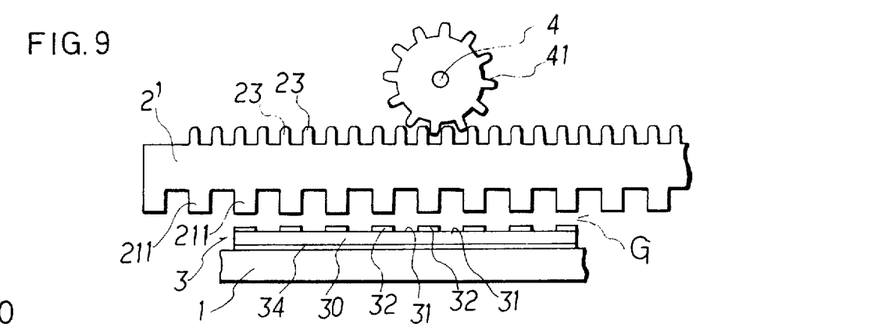
FIG. 9 is a front view illustrating an embodiment wherein the moving yoke of the apparatus of the present invention is adapted as a linear moving type.

The moving yoke in accordance with the present invention can be not only be formed as a rotary type as described above but also formed to reciprocate in a linear direction. For example, as shown in FIG. 9, moving yoke 2' can be formed in the shape of square bar and provided with a plurality of projected segments 211 in parallel on the lower surface so as to intersect at a right angle to the lengthwise direction of the moving yoke with gear teeth 23 on the upper surface engaging gear 41 mounted on revolving shaft 4.

In this case, the device opposing to said projected segments 211 can be formed in the shape of long plate which is longer in the direction of movement of said moving yoke and shorting segments 31 can be formed and arranged in parallel so as to intersect at a right angle to the lengthwise direction, that is, so as to be across semiconductor plate 30 in the direction intersecting the moving direction of the moving yoke. In this case, a desired number of pulses can be generated in accordance with the amount of movement of the moving yoke.

In the apparatus in accordance with the present invention, the magnetic flux is concentrated by the projected segments provided on the moving yoke. However, since there is a certain distance between the projected segment and the device, the magnetic flux between the projected segment and the device is diverged at the device side and may provide adverse effect on the resistance variation ratio of the device fixed at the fixed yoke.

Figure 10:
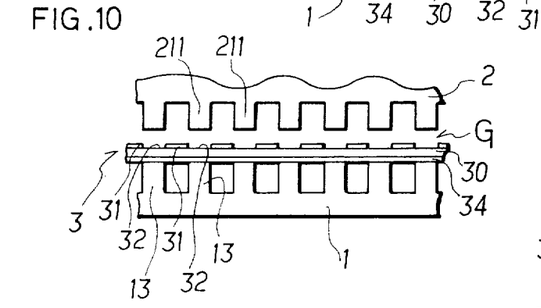
FIG. 10 is a front view illustrating an embodiment wherein the fixed yoke is provided with receiving projections.

To eliminate adverse effect, receiving projections 13 can be provided on fixed yoke 1 which project opposite to magnetism sensing parts 32 and the device 3 can be arranged so that magnetism sensing parts 32 are positioned on the corresponding receiving projections as shown in FIG. 10. In this configuration, when projected segments 211 of the moving yoke are opposed to the magnetism sensing parts, projected segments 211 are opposed to receiving projections 13 on the fixed yoke as shown and therefore the concentration efficiency of the magnetic flux is improved and a favorable pulse waveform can be obtained.

Figure 11:
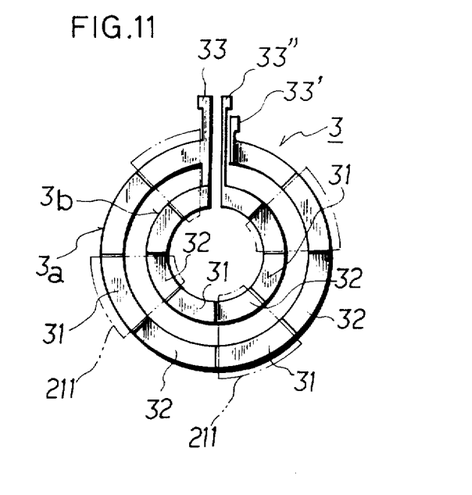
FIGS. 11, 13, 14 and 15 are plan views illustrating an embodiment wherein the magnetro-resistance effect device is adapted to have three terminals.

In the above embodiments, all the magnetoresistance effect devices are provided with two terminals. These devices can be provided with three terminals. For example, as shown in FIG. 11, device 3 is formed so that large-diameter outer link device member 3a and small-diameter inner link device member 3b which are partly chipped are arranged concentrically to form a dual link, one end of the outer link device member is connected to one end of the inner link device member. The electrode is provided at the connected portion of both said device members as intermediate terminal 33'' and the other electrodes are provided respectively at the other ends of both said device members as terminals 33 and 33'. A plurality of magnetism sensing parts 32 divided by shorting segments 31 are provided on both said device members.

The positions of shorting segments 31 provided on both said device members are determined so that projected segments 211 are opposed to shorting segments 31 on inner link device member 3b when said projected segments are opposed to magnetism sensing parts 32 on link device member 3a and said projected segments are opposed to the magnetism sensing parts on inner link device member 3b when the projected segments are opposed to the shorting segments of outer link device member 3a.

Figure 12:
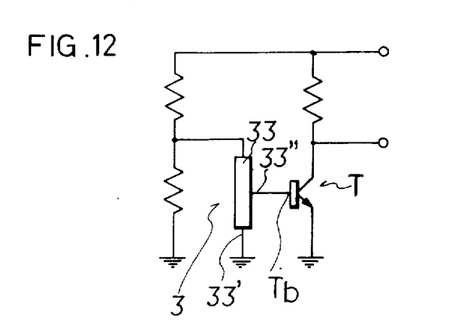
FIG. 12 is a circuit diagram showing connection of the magneto-resistance effect device wherein the device is adapted to have three terminals.

In the configuration described above, since the magnetic flux is applied to the magnetism sensing parts of both device members alternately, the resistance values of both device members vary alternately. Accordingly, since the voltage at intermediate terminal 33" varies greatly in the pulse waveform if the specified voltage is applied across terminals 33 and 33' at both ends of device 3, transistor T alternately switches along with the revolution of the moving yoke when the intermediate terminal is connected to base Tb of switching transistor T as shown in FIG. 12 and the potential of the intermediate terminal is applied as the base bias voltage.

Figure 13:
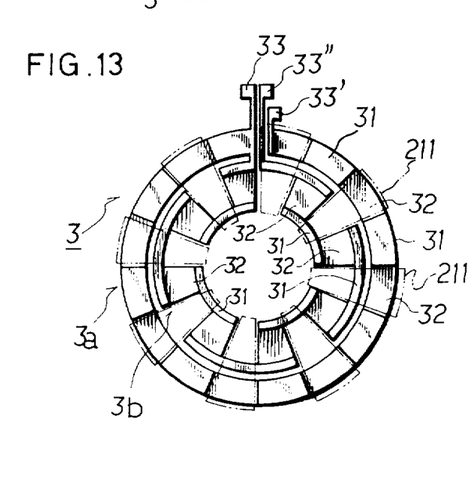

When it is necessary to make the resistivity value of inner link device member 3b equal to that of outer link device member 3a, inner link device member 3b can be formed in the meandering shape so that the overall length of said inner link device is equal to the length of said outer link device member as shown in FIG. 13.

Figure 14:
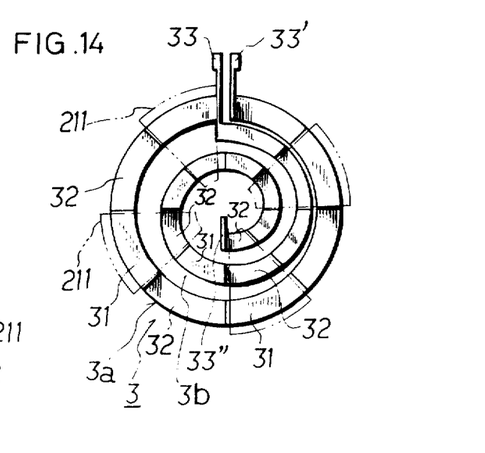

As shown in FIG. 14, inner link device member 3b can be formed in the eddy shape so that the length of the inner link device member is equal to that of the outer link device member.

Figures 15, 16:
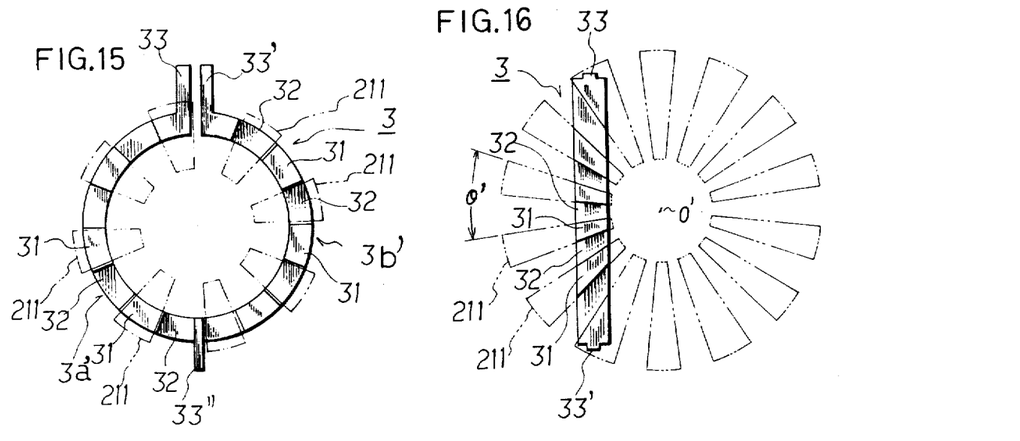
FIGS. 16 to 19 are plan views illustrating an embodiment of the magneto-resistance effect device wherein the device is made in the form of long plate and the moving yoke is made as a revolving type.

If the device is provided with three terminals, it need not always be formed in the dual link shape, and as shown in FIG. 15 a partly chipped link device can be employed and provided with intermediate terminal 33" at the central part of the device. A similar effect is obtained if the device is constructed so that, when the projected segments are opposed to shorting segments 31 on one of part 3a' between the intermediate terminal 33" and one terminal 33 and part 3b' between intermediate terminal 33" and other terminal 33', projected segments 211 are opposed to magnetism sensing parts 32 on the other of said two parts 3a' and 3b'.

Referring to FIG. 16, there is shown as embodiment according to which the moving yoke is formed in a rotary type as in case of the embodiment shown in FIG. 1 and the magneto-resistance effect device is made in a long rectangular form.

The lengthwise direction of device 3 forms a chord in reference to the circumference of the moving yoke. In other words, the device is set so that a line extended from axis A of revolution of the moving yoke is positioned at the side of the device. The device is provided with shorting segments 31 which are arranged along the radial lines originating from point 0' on a line extended from said axis A.

As described in the embodiments, the shorting segments are arranged across both terminals of the device, that is, arranged in the direction intersecting the current flowing direction.

Said shorting segments are arranged so that they form equal angles $\theta'$ in reference to said point 0' and said magnetism sensing parts form equal angles in reference to said point 0'. On the other hand, projected segments 211 on the moving yoke are arranged so that they are opposed to corresponding magnetism sensing parts at the same time and to corresponding shorting segments when the moving yoke is turned by a certain fixed angle from the above condition.

In this embodiment, the pulse can be generated as in the embodiment shown in FIG. 1. Moreover, the superior point with respect to the embodiment in FIG. 1 is that the waste of the material is less in manufacturing the device since the device is made in a long rectangular form and therefore the material can be effectively used and the device can be made at a low cost.

Figure 17:
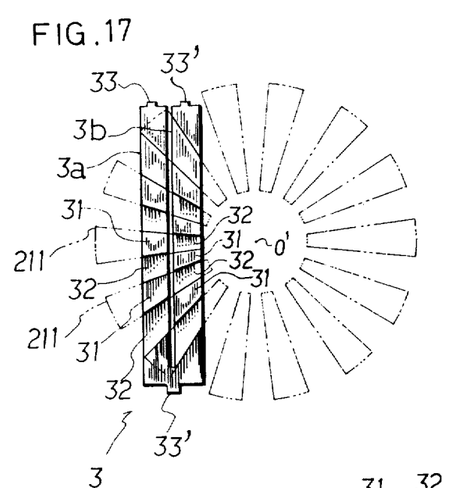

When the shorting segments are radially arranged on the device, the device can be provided with three terminals as shown in FIG. 17. In this case, a pair of long plate type device members 3a and 3b are arranged in parallel, one end of both device members are connected, and intermediate terminal 33" is provided at the connected portion of the device members. Terminals 33 and 33' are provided at other ends of both device members. Moreover, the shorting segments are positioned so that the magnetic flux is alternately applied from projected segments 211 of moving yoke 2 to magnetism sensing parts 32 of both device members 3a and 3b.

Figure 18:
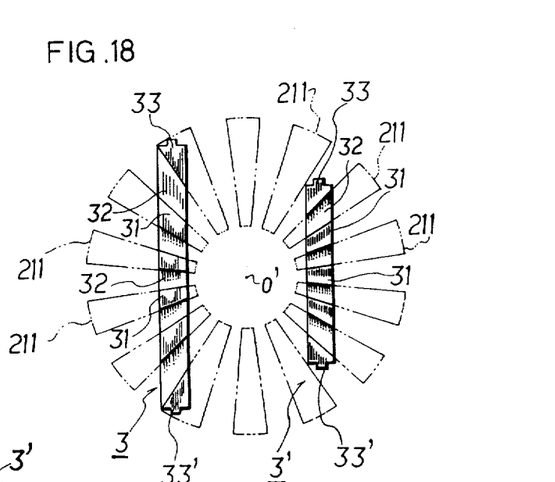

As shown in FIG. 18, a pair of independent magneto-resistance effect devices 3 and 3' can be adapted so that the magnetic flux is applied to the magnetism sensing parts of the device members alternately. In this case, the pair of these devices need not always be arranged in parallel.

If one of the ends of a pair of independent devices are electrically connected with a conductor, etc., the device can be used in the same manner as in case of the device provided with three terminals as described above.

Figure 19:
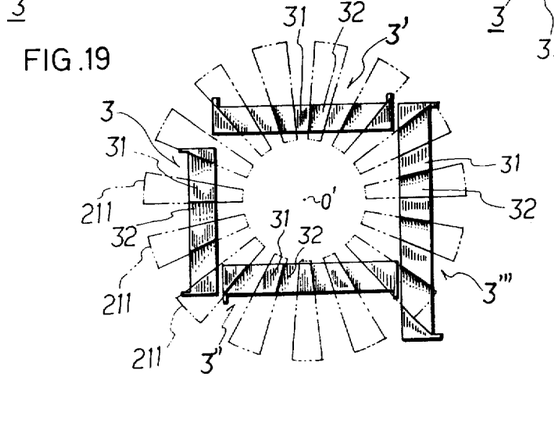
Figure 20:
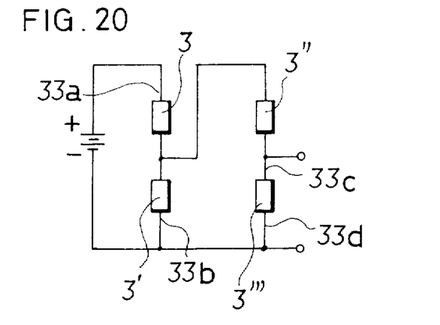
FIG. 20 is a connection diagram showing connection of the magneto-resistance effect device wherein the apparatus in accordance with the present invention employs four magneto-resistance effect devices shown in FIG. 19.

Furthermore, more than two independent magnetoresistance effect devices can be provided. For example, as shown in FIG. 19, four devices 3, 3', 3" and 3''' are arranged so that each of them forms each side of a quadrilateral and shorting segments 31 are positioned so that the magnetic flux is alternately applied to the magnetism sensing parts on devices 3 and 3" and those on devices 3' and 33". As shown FIG. 20, devices 3 and 3' are connected in series, devices 3" and 3''' are also connected in series and a device group consisting of devices 3" and 3''' is connected in parallel with device 3'. In this configuration, when the specified voltage is applied across terminal 33a of device 3 and terminal 33b of device 3' and moving yoke 2 is revolved, a pulse of large waveform value can be obtained from both terminals 33c and 33d of device 3'''.

Figure 21:
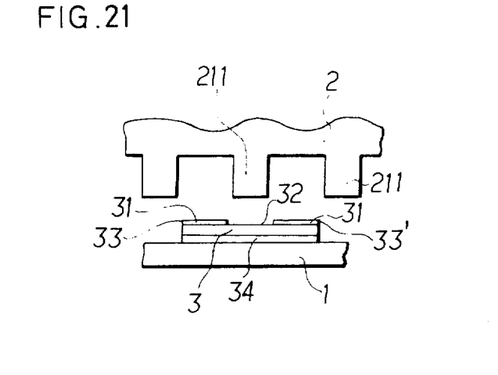
FIG. 21 is a partly magnified front view illustrating an embodiment of the apparatus of the present invention in which the magneto-resistance effect device is provided with one magnetism sensing part.
Figure 22:
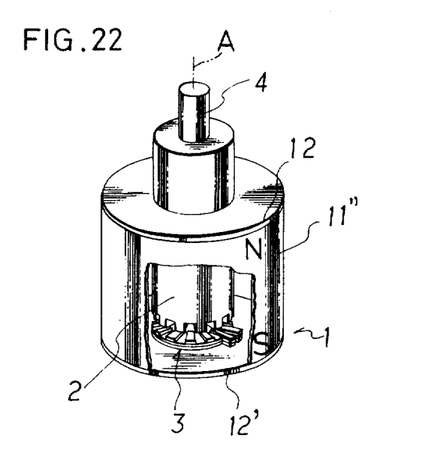
FIG. 22 is a partly cutway isometric view illustrating another embodiment of the fixed yoke to be employed in the apparatus of the present invention.

Hereupon, a plurality of magnetism sensing parts need not always be provided on magneto-resistance effect device 3. As shown in FIG. 21, shorting segments 31 can be provided only on both ends of semiconductor plate 30 to form one magnetism sensing part 32 and terminals 33 and 33' can be provided at said shorting segments 31. If a plurality of magnetism sensing parts are provided as in cases of said embodiments, the apparatus is advantageous because the variation of the resistance value of the devices can be large. If moving yoke 2 is adapted to be a rotary type, it can be constructed using cylindrical magnet 11" which is magnetized at both axial ends so that moving yoke 2 is positioned inside said magnet.

In the apparatus in accordance with the present invention, the moving yoke moves along the flat part of the fixed yoke and therefore the magnetic flux always flows between the projected segments and the fixed yoke. Accordingly, since the distribution of the magnetic flux as seen from the moving yoke does not vary, the magnetic flux is uniformly applied to the magnetism sensing parts on the magnetroresistance effect device.

Moreover, the waveform of the output pulse can be easily determined by varying the length of the magnetism sensing parts, the size of projected segments on the moving yoke or the distance between the projected segments.

What is claimed is:

1. A revolution sensing apparatus for sensing the rotation of a machine said apparatus comprising a. a fixed yoke made of a magnetic material and having a flat part,
b. a moving yoke made of a magnetic material having an extreme end opposed to said flat part with a gap therebetween said moving yoke being adapted to be moved by the revolution torque of said machine in a direction along said flat part, said moving yoke having a plurality of projected segments facing said flat part of the fixed yoke the projected segments being arranged in a direction of movement of said moving yoke,
c. a magnetism generating means operatively connected to at least one of said yokes, and
d. at least one magneto-resistance effect device having two ends and having at least one magnetism sensing part positioned in said gap opposed to said projected segment said magneto-resistance effect device comprising a magnetism sensing semiconductor plate and at least one shorting segment made of a conductive material and arranged across said semiconductor plate in a direction intersecting the direction of movement of said moving yoke, whereby said magneto-resistance effect device includes a plurality of magnetism sensing parts which are formed with intervals therebetween said shorting segment being positioned within said intervals in the direction of movement of the moving yoke and wherein said magnetism sensing parts are adapted to simultaneously oppose said projected segments, wherein said both yokes are arranged so that a magnetic circuit is formed by said magnetism generating means and the magnetic flux crossing said gap at a right angle to the direction of movement of said moving yoke, and wherein the magnetic flux concentrated by said projected segment is applied to said magnetism sensing parts in sequence as said moving yoke moves.

2. A revolution sensing apparatus in accordance with claim 1, wherein said moving yoke has an axis of revolution and is adapted to revolve around said axis and said projected segments are arranged in the direction of revolution on said moving yoke in reference to the axis of revolution of said moving yoke and wherein said magneto-resistance effect device has a rectangular shape with its length along the direction of linear movement.

3. A revolution sensing apparatus in accordance with claim 1, further including a revolving shaft which can be revolved by the revolution torque of said machine and a conversion means which converts the revolution of said revolving shaft into linear movement and transmits said movement to said moving yoke, said moving yoke being adapted for linear movement and wherein said projected segments are arranged in a line.

4. A revolution sensing apparatus in accordance with claim 1, wherein said moving yoke includes an axis of revolution and is revolved about said axis, and wherein said projected segments are arranged in the direction of revolution on said moving yoke in reference to the axis of revolution of said moving yoke and said magneto-resistance effect device is formed in a shape of a partly chipped link concentrically about said axis of revolution.

5. A revolution sensing apparatus in accordance with claim 1, wherein said moving yoke includes an axis of revolution and is revolved about said axis and wherein said projected segments are arranged in the direction of revolution of said moving yoke in reference to the axis of revolution of said moving yoke, and wherein said magneto-resistance effect device is made in a long straight form and said shorting segments are radially provided in reference to a specified point on a line extending from said axis of revolution.

6. A revolution sensing apparatus in accordance with claim 1, wherein the length of the extreme end faces of said projected segments is shorter than the length of said shorting segments provided in said same direction.

7. A revolution sensing apparatus in accordance with claim 1, wherein said magneto-resistance effect device is provided three terminals one formed at each end of the device and one formed at an intermediate part and magnetic flux is applied to the magnetism sensing parts of a pair of the device members alternately which are formed by dividing the device at said intermediate terminal.

8. A revolution sensing apparatus in accordance with claim 7, wherein said magneto-resistance effect device is formed in a dual link shape comprising a pair of partly chipped link type outer and inner device members the end of the outer device member being connected to the end of the inner device member and an intermediate terminal provided at a connected portion of said outer and inner device members.

9. A revolution sensing apparatus in accordance with claim 8, wherein said inner device member is formed in an eddy shape.

10. A revolution sensing apparatus in accordance with claim 8, wherein said inner device member is formed in a meandering shape.

11. A revolution sensing apparatus in accordance with claim 7, wherein said magneto-resistance effect device is formed in a partly chipped link shape, and said intermediate terminal is provided at the center between the ends of the device.

12. A revolution sensing apparatus in accordance with claim 7, wherein a pair of long straight shaped device members are arranged in parallel and said intermediate terminal is provided at the connected portion of one end of one device member and one end of the other device member.

13. A revolution sensing apparatus in accordance with claim 1, including a plurality of receiving projections opposing to said extreme end of said moving yoke on said flat part of the fixed yoke and wherein magneto-resistance effect devices are secured on said receiving projections so that said magnetism sensing parts are positioned on said receiving projections.

* * * * *